June 21, 1955 W. J. PIETENPOL 2,711,511

ELECTRICAL HYGROMETER

Filed May 23, 1952

INVENTOR
W. J. PIETENPOL
BY
[signature]
ATTORNEY

United States Patent Office 2,711,511

Patented June 21, 1955

2,711,511

ELECTRICAL HYGROMETER

William J. Pietenpol, Plainfield, N. J., assignor to Bell Telephone Laboratories, Incorporated, New York, N. Y., a corporation of New York Application May 23, 1952, Serial No. 289,521

12 Claims. (Cl. 324—71)

This invention relates to methods of and apparatus for the measurement of humidity and more particularly to electrical hygrometers employing moisture sensitive elements of semiconductive material.

An object of this invention is to facilitate the measurement of humidity.

Another object of this invention is to improve electrical hygrometers.

Other objects of this invention are to simplify the construction of electrical hygrometers, to reduce their cost, to improve their stability, and to decrease tendencies towards inaccuracy due to variations in ambient conditions.

A feature of this invention involves determining the relative humidity of an atmosphere by measuring the reverse impedance of a semiconductive body containing an exposed n-p junction which has been humidity calibrated.

Another feature of this invention pertains to utilization of an n-p junction in semiconductive material as a moisture sensitive element for a hygrometer.

Another feature resides in eliminating or compensating for changes in the electrical characteristics of n-p junctions with changes in light intensity in the vicinity of the junction and changes in ambient temperature, while maintaining a high degree of sensitivity to changes in moisture.

Other features reside in thermal and incident light compensating circuits for a hygrometer employing semiconductive n-p junctions as sensing elements and structures for shielding sensing elements from light.

In one specific embodiment of this invention, a humidity sensing element comprises a single crystal of germanium containing a section of n-type conductivity, i. e., one containing a predominance of unbound negative charge carriers, electrons, a section of p-type conductivity, i. e., one containing a predominance of unbound positive charge carriers, holes, and an intermediate junction mounted for the free access of the humidity of the atmosphere to be tested. Ohmic connections are made to the germanium on opposite sides of the junction and the combination is connected to a current source poled in the reverse direction of conduction through the germanium, i. e., with the n-type material positive relative to the p-type material. The direct-current reverse impedance of the junction varies with the humidity of the atmosphere surrounding it. This variation is reversible and reproducible so that impedance values correspond to particular relative humidity percentages consistently, all other perameters being constant, and hence the current through the device corresponds to the humidity so that a suitable meter calibrated for direct readings of relative humidity may be used.

The above and further objects and features of this invention will be more fully appreciated from the following detailed description when read in conjunction with the accompanying drawing in which.

Figure 1:
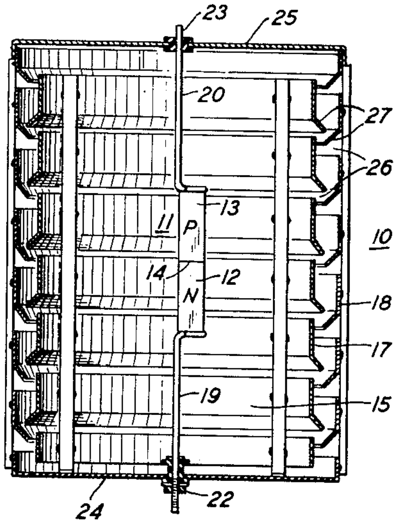
Fig. 1 is a sectioned elevation of one form of moisture sensitive element in a housing which provides a mechanical and light shield.

Referring to the drawing, a moisture sensitive unit 10 is shown in Fig. 1. This unit comprises a body 11 of germanium or silicon having an n section 12, a p section 13, and an intermediate junction 14. Such bodies may be of single crystal form. The surfaces of the body 11 are exposed to the humidity of the atmosphere of the interior of housing 15 comprising nested cylinders 17 and 18 each of which is composed of a group of coaxial rings having common radii. Leads 19 and 20 extending from terminals 22 and 23 on the ends 24 and 25 of housing 15 support the body 11 so that its surface, particularly that in the region of junction 14 is situated for the free circulation of the housing atmosphere over it.

The direct-current reverse impedance of germanium and silicon p-n junctions is extremely sensitive to temperature changes and to changes in the incident light intensity. The housing 10 of Fig. 1 is provided with double walls having non-registering louvers 26 and adjacent louver boards or baffles 27 which facilitate the admission of the gas to be tested to the housing while impeding the access of light and thereby eliminating changes in direct-current junction impedance due to variations in incident light. The light shielding effect of housing 15 can be further improved by aplying a dark non-reflecting coating to both walls of cylinder 17 and the inner wall of cylinder 18. Other means for eliminating the effect of light variations on the impedance of the sensing element 11 may be employed; for example, a constant source of light may be maintained in the vicinity of the device so that a biasing light is incident on the junction to effect a constant excitation of charge carriers in the semiconductor at such a level that further incident light will have substantially no effect on the direct-current impedance of the junction.

The surfaces of semiconductive materials such as germanium and silicon are sensitive to certain atmospheric impurities which may react with or build up deposits on the surfaces and thereby cause a deterioration of electrical characteristics. Some protection from these effects can be provided on humidity sensing elements without appreciably reducing their humidity sensitivity by coating them with a layer of protective material, for example a silicone grease, such as that produced by Dow Corning and identified as DC–200. This material is transparent to humidity and opaque to many detrimental substances.

Figure 2:
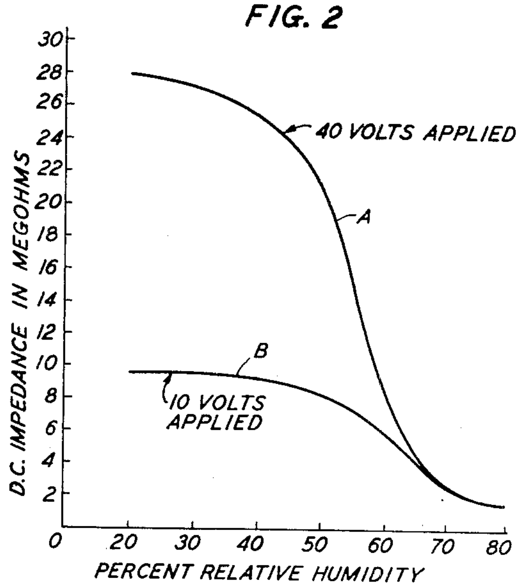
Fig. 2 is a plot of direct current reverse impedance against percent relative humidity for a typical hygrometer sensing element having a single n-p junction.

A semiconductive n-p junction according to this invention can be calibrated against relative humidity as disclosed in the curve of Fig. 2 when arranged for the elimination of light variations. The curves of Fig. 2 show the typical direct-current reverse impedance of a germanium n-p junction at applied voltages of 40 volts, curve A, and 10 volts, curve B. The units for which these curves were obtained have single crystal germanium bodies containing an n-p junction and having an n-type resistivity of about 5 ohm-centimeters and a p-type resistivity of about 1 ohm-centimeter, constructed in accordance with the process disclosed in the application of G. K. Teal, Serial No. 168,184, filed June 15, 1950. These bodies were 30 by 36 mils in cross section, 0.125 inch long and had their junctions located approximately centrally along their length. Tin plated nickel wire electrodes were secured to the ends of the bodies with 63 per cent tin, 35 per cent lead, 2 per cent antimony solder on the n side, and 65 per cent tin, 35 per cent lead, 0.1 per cent indium solder on the p side to provide large area ohmic contacts. The surface of the bodies was subjected to a mechanical polish and an etch with the etchant disclosed in R. D. Heidenreich application Serial No. 164,303, filed May 25, 1950 now Patent 2,619,414 issued November 25, 1952.

Curves A and B were obtained by maintaining the test units in a chamber which was dark, at a substantially constant temperature of about 80° F. and varying the humidity within the chamber. It is to be noted from the curves that the units are sensitive from about 20 per cent to about 80 per cent relative humidity and particularly marked changes in impedance with relative humidity occur in the range from 40 per cent to 70 per cent. Since germanium and silicon bodies are substantially impermeable to water, the effects of humidity on the direct-current impedance of these units has been attributed to surface effects. The change in impedance with humidity may be due to a bending of energy levels at the surface of the semiconductive material in the region of the junction, caused by surface states, a change in the lifetime of minority carriers, and surface conduction in the presence of high fields which are present near the junction. These effects may occur separately or jointly to affect the rapid changes and reversibility in the direct-current impedance of the device which are obtained.

While the curves A and B have been plotted for germanium units having n-p junctions which are produced during the growing of the crystal, it is to be understood that other single junction body forms can be employed as humidity sensitive elements. Junctions suitable for such elements may be formed for example by applying slight amounts of certain materials of the third or fifth group of the periodic table to n or p-type semiconductive material, respectively, and subjecting the material to a treatment which causes a migration of the impurities into the semiconductor to effect a conversion of conductivity type. An n-p junction can be formed by mounting a Phosphor-bronze contact on the surface of an n-type germanium body and passing currents of high density through the contact. The construction of such a point contact device might be in the form of a type detector having the region surrounding the junction exposed to the atmosphere. Junctions can also be produced by thermal conversion as disclosed in G. L. Pearson Patent 2,560,594 issued July 17, 1951.

The curves of Fig. 2 indicate that a substantially linear plot of direct-current impedance against relative humidity is obtained over a wider range of humidities at 40 volts bias than at 10 volts bias for a grown junction device. While grown junction devices can be operated as humidity sensing devices at from about 0.1 volt to about 2500 volts reverse bias, a convenient range of operating voltages is from 0.1 volt to 100 volts. Similarly formed junction devices can be operated from about 5 volts to about 50 volts.

Figure 3:
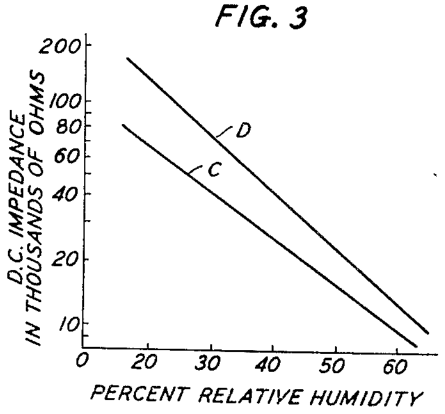
Fig. 3 is a plot of the direct-current impedance on a logarithmic scale against percent relative humidity on a linear scale for a typical hygrometer sensing element having a double junction.
Figure 4:
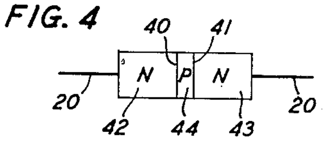
Fig. 4 is an elevation of a second form of moisture sensitive element containing a pair of n-p junctions.

The characteristics of another form of semiconductive junction sensing element are shown in Fig. 3. These elements as illustrated in Fig. 4 contain double junctions 40 and 41 and have a body structure comprising two n sections 42 and 43 and an intermediate p section 44. The test elements from which the disclosed curves were obtained were single crystal germanium bodies produced by the same techniques as the single junction bodies and having a low resistivity n-type end of less than 0.05 ohm-centimeters resistivity, a high resistivity n-type end of about 3 ohm-centimeters resistivity and a p-type intermediate section of about 1 ohm-centimeter resistivity. The bodies were 0.125 inch long and had square cross sections of from about 25 to about 40 mils. Tin plated nickel wire leads were soldered with 63 per cent tin, 35 per cent lead, 2 per cent antimony solder to the n sections.

These double junction devices have linear characteristics on a semilogarithmic plot over a wide range of humidity and have satisfactory responses with either end biased positive as shown in the curves, curve C representing a unit biased at 5 volts in the low impedance direction, with the low resistivity n-type end biased positive, and curve D representing a unit biased at 5 volts in the high impedance direction, with the high resistivity n-type end biased positive. The units are very sensitive to humidity at low relative humidities.

Figure 5:
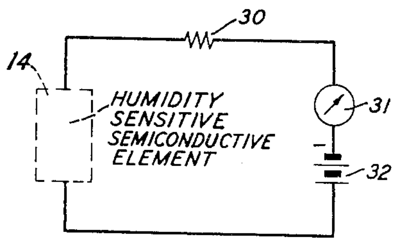
Fig. 5 depicts a typical circuit for an electrical hygrometer constructed in accordance with this invention.

A typical hygrometer circuit utilizing a junction semiconductive sensing element of either the single or multiple junction form is shown in Fig. 5. This circuit comprises a series combination of a sensing element 14, a limiting resistor 30, a galvanometer 31, and a bias battery 32. The battery is poled to apply a reverse bias to a single junction element, the n-type section biased positive relative to the p-type section, or either polarity of bias may be applied to a multiple junction device since one junction will under all conditions be biased in its reverse direction. Calibration in per cent relative humidity can be applied directly to the galvanometer scale so that a reduction in the direct-current impedance of the sensing element 14 with an increase in humidity is reflected as an increase in current through the circuit on the galvanometer corresponding to that humidity. Alternatively, other means responsive to changes in humidity might be substituted for the galvanometer 31 to effect desired operations such as the closing of an electrical circuit or the adjustment of a valve.

Figure 6:
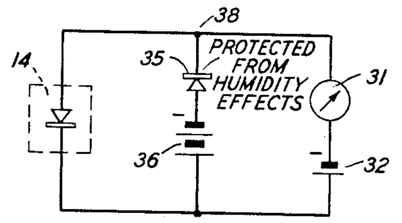
Fig. 6 represents a compensated circuit for an electrical hygrometer, illustrative of this invention.

Variations of temperature and incident light on the sensing element 14 can be electrically compensated for as illustrated in the circuit of Fig. 6. That circuit is arranged so that the current flowing through galvanometer 31 corresponds only to humidity variations in the vicinity of sensing element 14. The shunt branch containing the compensating element 35 and biasing battery 36 eliminates the effects of variations of light and/or temperature on element 14. Compensation for the desired variable is effected by maintaining a constant potential at point 38 as the undesired variable changes so that there is no tendency for the current through that point from galvanometer 31 and battery 32 to change.

Considering a temperature compensated circuit, the element 35 is of identical electrical characteristics as the sensing element 14 and is mounted so that it is protected from the changes of humidity to which element 14 is subjected while it receives the same temperature changes as element 14. These electrically identical elements may both be single crystal germanium bodies having n-p junctions and having the same direct-current impedances and temperature coefficients of resistance. When the impedances of element 14 and compensator 35 are equal and the potential of battery 36 is twice that of battery 32 and opposing it, no current flows through galvanometer 31. Compensator 35 is mounted in a housing which protects it from moisture while permitting it to maintain the same temperature as sensing element 14. As the temperature of element 14 increases its direct-current impedance decreases, but compensator 35 increases in temperature and decreases in direct-current impedance the same amount. As the direct-current impedance of element 14 declines the current through it increases; however, since the circuit remains in balance by the corresponding decrease in the direct-current impedance of compensator 35, no current is drawn from battery 32 through galvanometer 31. Similarly, when the circuit is out of balance by virtue of the action of humidity on element 14 and current is flowing through galvanometer 31 to indicate the humidity level, the effects of temperature variations are compensated for by compensator 35 since the variations in the direct-current impedance of element 14 and compensator 35 are such as to maintain a constant degree of unbalance in the circuit.

The circuit of Fig. 6 has been described as a thermal compensating means; however with suitable structural modification of the compensator element and its housing it can be employed as a light compensator or a combined thermal and light compensating means. When identical structures are employed as the active electrical elements of sensing element 14 and compensator 35, their variations with and sensitivity to incident light are identical. Thus, balance can be maintained in the circuit with variations in incident light by housing and mounting compensator 35 so that it is subjected to the same incident light as element 14. A mounting for light and heat compensation can be constructed by supporting identical junction elements adjacent each other with the surface of sensing element 14 exposed to the atmosphere and compensating element protected from the atmosphere by a housing which is transparent to light and of good heat conducting material. One suitable housing for compensator 35 is a glass tube having sealed ends and a dry atmosphere.

It is to be understood that the above-described arrangements are illustrative of the application of the principles of the invention. Numerous other arrangements may be devised by those skilled in the art without departing from the spirit and scope of the invention.

What is claimed is:

1. An electrical hygrometer comprising a semiconductive body having at least one portion of one conductivity type, at least one other portion of the opposite conductivity type and an electrical junction between said portions, said semiconductive body having its surface exposed to atmospheric humidity, means connected across the junction to bias said junction in its reverse direction of conduction, indicating means in circuit with said body, and means associated with said body to substantially eliminate the effects of thermal and incident light variations on said semiconductor body while maintaining the sensitivity of said semiconductor body to moisture variations.

2. An electrical hygrometer comprising a semiconductive body containing zones of opposite conductivity type and an intermediate junction, an electrode on each side of said junction, said semiconductive body having its surface exposed to the atmospheric humidity, means connected across said junction to bias said junction electrically in its reverse direction of conduction, indicating means in circuit with said body, and circuit means connected to said body to substantially eliminate the effects of thermal and incident light variations on said semiconductor body while maintaining the sensitivity of said semiconductor body to moisture variations.

3. An electrical hygrometer comprising a semiconductive body having ohmic contact to one surface and a restricted area contact spaced from said ohmic contact, the bulk of said body being of one conductivity type material and a region immediately below said restricted area contact being of the opposite conductivity type material, said body having its surface in a region of said restricted area contact including both conductivity types of material exposed to the atmospheric humidity, means connected to said restricted area contact to bias said body in its high impedance direction of conduction, indicating means in circuit with said restricted area contact and said body, and means associated with said body to substantially eliminate the effects of thermal and incident light variations on said semiconductor body while maintaining the sensitivity of said semiconductor body to moisture variations.

4. An electrical hygrometer comprising a semiconductive body having two sections of one conductivity type and an intermediate section of the opposite conductivity type, an electrode to each of said regions of like conductivity type, said semiconductive body having its surface exposed to the atmospheric humidity, biasing means connected across said electrodes for said semiconductive body, indicating means in circuit with said semiconductive body, and means associated with said body to substantially eliminate the effects of thermal and incident light variations on said semiconductor body while maintaining the sensitivity of said semiconductor body to moisture variations.

5. A humidity sensitive element for an electrical hygrometer comprising a body of semiconductive material containing zones of opposite conductivity type and an intermediate junction, an electrode to said body on each side of said junction, a support for said body maintaining it for free circulation of the atmosphere over its surface, and a light shield for said body which allows the free flow of atmosphere to said body.

6. An electrical hygrometer comprising a semiconductive body selected from the class consisting of silicon and germanium containing zones of opposite conductivity type and an intermediate junction, said body having its surface in the vicinity of said junction exposed to the atmospheric humidity, electrical connections to said body on the opposite sides of said junction, means connected across said junction for biasing said junction in its high impedance direction, indicating means in circuit with said biasing means and said body, and circuit means connected to said body for substantially eliminating the variations in the flow of current through said indicating means due to variations in the temperature or incident light on said semiconductive body while permitting variations in the flow of current through said indicating means due to humidity variations in the vicinity of said body.

7. An electrical hygrometer comprising a semiconductive body containing a region of one conductivity type, a second region of the opposite conductivity type and a junction intermediate said regions, an electrode on each side of said junction, means for maintaining said body for the free access thereto of the humidity of the atmosphere to be tested, means connected across said body and electrically biasing said body in its high impedance direction, indicating means calibrated in relative humidity in circuit with said body and said biasing means, and means associated with said body to substantially eliminate the effects of thermal and incident light variations on said body while maintaining the sensitivity of said body to moisture variations.

8. An electrical hygrometer comprising a semiconductive body containing a plurality of junctions between regions of opposite conductivity types, the impedance of said body being sensitive to moisture, a pair of electrodes connected to said body on opposite sides of a plurality of said junctions, means for maintaining said body for the free access thereto of the humidity of the atmosphere to be tested, electrical biasing means connected across said body, electrical means in circuit with said body responding as a function of the humidity to impedance variations of said body, and means associated with said body to substantially eliminate the effects of thermal and incident light variations on said body while maintaining the sensitivity of said body to moisture variations.

9. An electrical hygrometer comprising a semiconductive body containing a region of one conductivity type, a second region of the opposite conductivity type and a junction intermediate said regions, an electrode on each side of said junction, means for maintaining said body for the free access thereto of the humidity of the atmosphere to be tested, means connected across said body and electrically biasing said body in its high impedance direction, electrical means in circuit with said body responding as a function of the humidity to impedance variations of said body, and electrical means in circuit with said body to substantially eliminate the effects of thermal variations on said body for maintaining the sensitivity of said body to humidity variations.

10. An electrical hygrometer comprising a semiconductive body containing a region of one conductivity type, a second region of the opposite conductivity type and a junction intermediate said regions, an electrode on each side of said junction, means for maintaining said body for the free access thereto of the humidity of the atmosphere to be tested, means connected across said body and electrically biasing said body in its high impedance direction, electrical means in circuit with said body responding as a function of the humidity to impedance variations of said body, and means associated with said body to substantially eliminate the effects of incident light variations on said body for maintaining the sensitivity of said body to humidity variations.

11. An electrical hygrometer comprising a semiconductive body containing a region of one conductivity type, a second region of the opposite conductivity type and a junction intermediate said regions, an electrode on each side of said junction, means for maintaining said body for the free access thereto of the humidity of the atmosphere to be tested, means connected across said body and electrically biasing said body in its high impedance direction, electrical means in circuit with said body and responding as a function of the humidity to impedance variations of said body, and means associated with said body to substantially eliminate the effects of temperature variations on said body for maintaining the sensitivity of said body to humidity variations.

12. An electrical hygrometer comprising a semiconductive body containing a region of one conductivity type, a second region of the opposite conductivity type and a junction intermediate said regions, an electrode on each side of said junction the impedance of said body being sensitive to moisture, means for maintaining said body for the free access thereto of the humidity of the atmosphere to be tested, means connected across said body and electrically biasing said body in its high impedance direction, a galvanometer calibrated in relative humidity in circuit with said body and said biasing means, and circuit means in circuit with said body for maintaining a substantially constant impedance in the circuit of said galvanometer with variations in the temperature and incident light on said body.

References Cited in the file of this patent

UNITED STATES PATENTS

| | | |
|---|---|---|
| 2,064,651 | Fiene | Dec. 15, 1936 |
| 2,377,426 | Kersten | June 5, 1945 |
| 2,585,353 | Strum | Feb. 12, 1952 |
| 2,603,694 | Kircher | July 15, 1952 |